US008971348B2

(12) United States Patent
Zhang et al.

(10) Patent No.: US 8,971,348 B2
(45) Date of Patent: Mar. 3, 2015

(54) ALLOCATION OF VOICE IDLE TIME PERIOD FOR INTER-RAT MEASUREMENT (71) Applicant: QUALCOMM Incorporated, San Diego, CA (US)

(72) Inventors: Wei Zhang, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/665,648

(22) Filed: Oct. 31, 2012

(65) Prior Publication Data

US 2014/0119211 A1 May 1, 2014

(51) Int. Cl.
H04J 3/16 (2006.01)
H04L 12/43 (2006.01)

(52) U.S. Cl.
USPC .......................................... 370/437; 370/459

(58) Field of Classification Search
CPC ......... H04B 17/003; H04Q 11/04; H04J 3/00; H04J 3/1682
USPC .......... 370/252, 328, 338, 437, 458, 459, 468
See application file for complete search history.

(56) References Cited

U.S. PATENT DOCUMENTS

| 7,200,124 | B2* | 4/2007 | Kim et al. .................... 370/324 |
| 7,474,749 | B2* | 1/2009 | Mauro ......................... 380/255 |
| 8,094,554 | B2* | 1/2012 | Gholmieh et al. ............ 370/230 |
| 8,249,608 | B2* | 8/2012 | Heo et al. ...................... 455/450 |
| 8,400,934 | B2* | 3/2013 | DiGirolamo et al. ......... 370/252 |
| 2006/0282259 | A1* | 12/2006 | Hetherington et al. ....... 704/201 |
| 2008/0170557 | A1* | 7/2008 | Yin .............................. 370/343 |
| 2009/0207818 | A1 | 8/2009 | Tsai et al. |
| 2010/0158161 | A1* | 6/2010 | Sambhwani et al. ......... 375/341 |
| 2011/0195702 | A1 | 8/2011 | Wu |
| 2011/0280140 | A1 | 11/2011 | Chin et al. |
| 2012/0113826 | A1 | 5/2012 | Zhou et al. |
| 2012/0164948 | A1 | 6/2012 | Narasimha et al. |
| 2013/0343381 | A1* | 12/2013 | Klimker ....................... 370/389 |

FOREIGN PATENT DOCUMENTS

WO 2011087518 A1 7/2011

OTHER PUBLICATIONS

Bessette B., et al., "The Adaptive-Multirate Wideband Speech Codec (AMR-WB)", IEEE Transactions on Speech and Audio Processing, IEEE Service Center, New York, NY, US, vol. 10, No. 8, Nov. 1, 2002, XP011079675, pp. 620-636, ISSN: 1063-6676.
International Search Report and Written Opinion—PCT/US2013/067316—ISA/EPO—Mar. 4, 2014 (122567WO).

* cited by examiner

Primary Examiner — Hong Cho
(74) Attorney, Agent, or Firm — Kristine U. Ekwueme (57) ABSTRACT To create gaps in communication activity to perform inter radio access technology (IRAT) measurement, a user equipment may isolate silent periods during voice communications. During those silent periods, instead of transmitting special bursts with erasure packets indicating silent periods, the UE may allocate the time slots that would otherwise have sent the special bursts and indicate those slots as idle so they may be used for other purposes, such as IRAT measurement.

16 Claims, 9 Drawing Sheets

ALLOCATION OF VOICE IDLE TIME PERIOD FOR INTER-RAT MEASUREMENT

BACKGROUND

1. Field

Aspects of the present disclosure relate generally to wireless communication systems, and more particularly, to allocating voice idle time period for inter-radio access technology measurement in Time Division Synchronous Code Division Multiple Access (TD-SCDMA) systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes detecting an erasure packet from a vocoder during a time slot of a transmission time interval (TTI). The method may also include utilizing the time slot as part of a measurement gap to perform an intraRAT or interRAT measurement.

According to another aspect of the present disclosure, an apparatus for wireless communication includes means for detecting an erasure packet from a vocoder during a time slot of a TTI. The apparatus may also include means for utilizing the time slot as part of a measurement gap to perform an intraRAT or interRAT measurement.

According to one aspect of the present disclosure, a computer program product for wireless communication in a wireless network includes a computer readable medium having non-transitory program code recorded thereon. The program code includes program code to detect an erasure packet from a vocoder during a time slot of a TTI. The program code also includes program code to utilize the time slot as part of a measurement gap to perform an intraRAT or interRAT measurement.

According to one aspect of the present disclosure, an apparatus for wireless communication includes a memory and a processor(s) coupled to the memory. The processor(s) is configured to detect an erasure packet from a vocoder during a time slot of a transmission time interval (TTI). The processor(s) is further configured to utilize the time slot as part of a measurement gap to perform an intraRAT or interRAT measurement.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
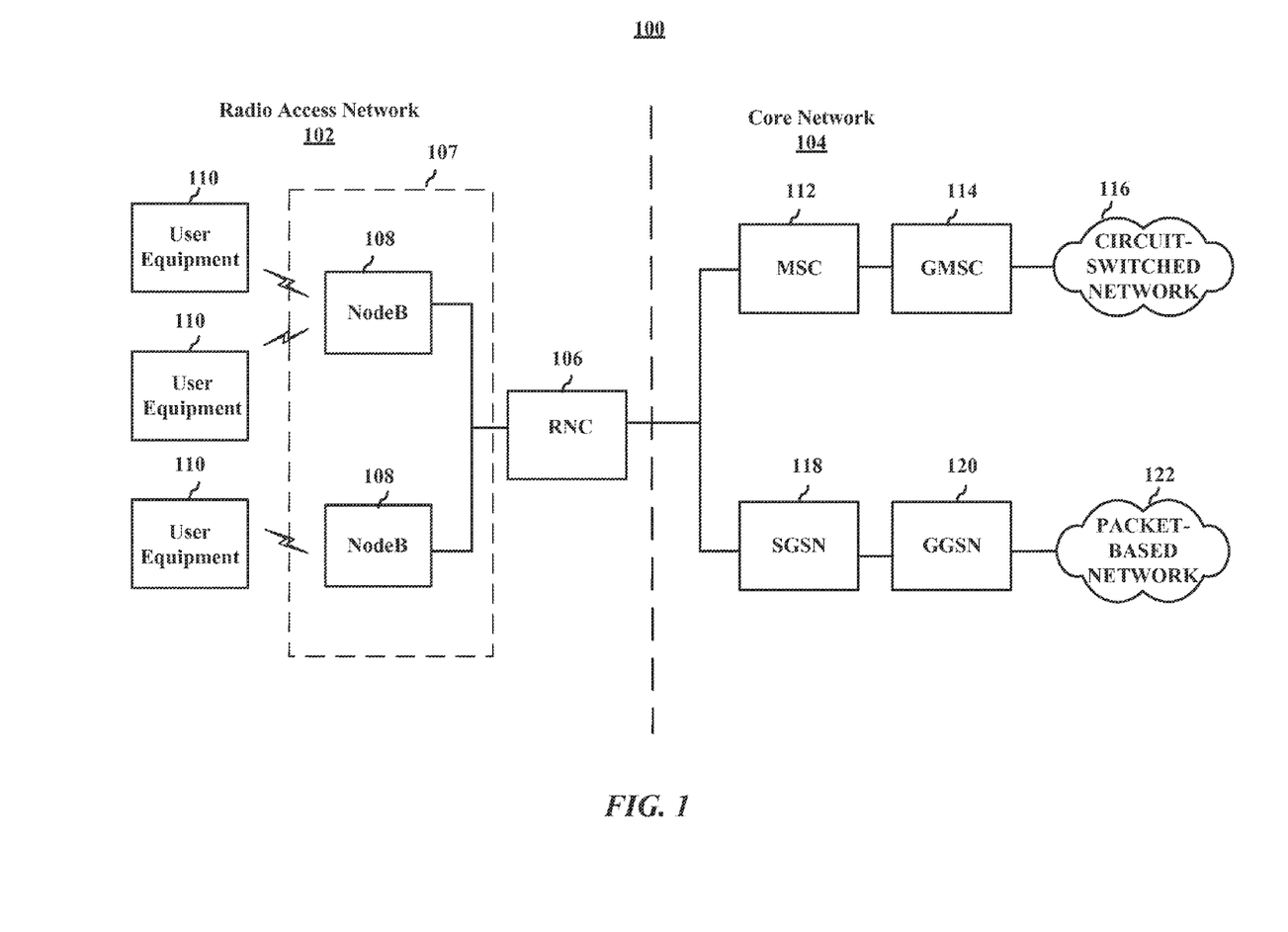
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
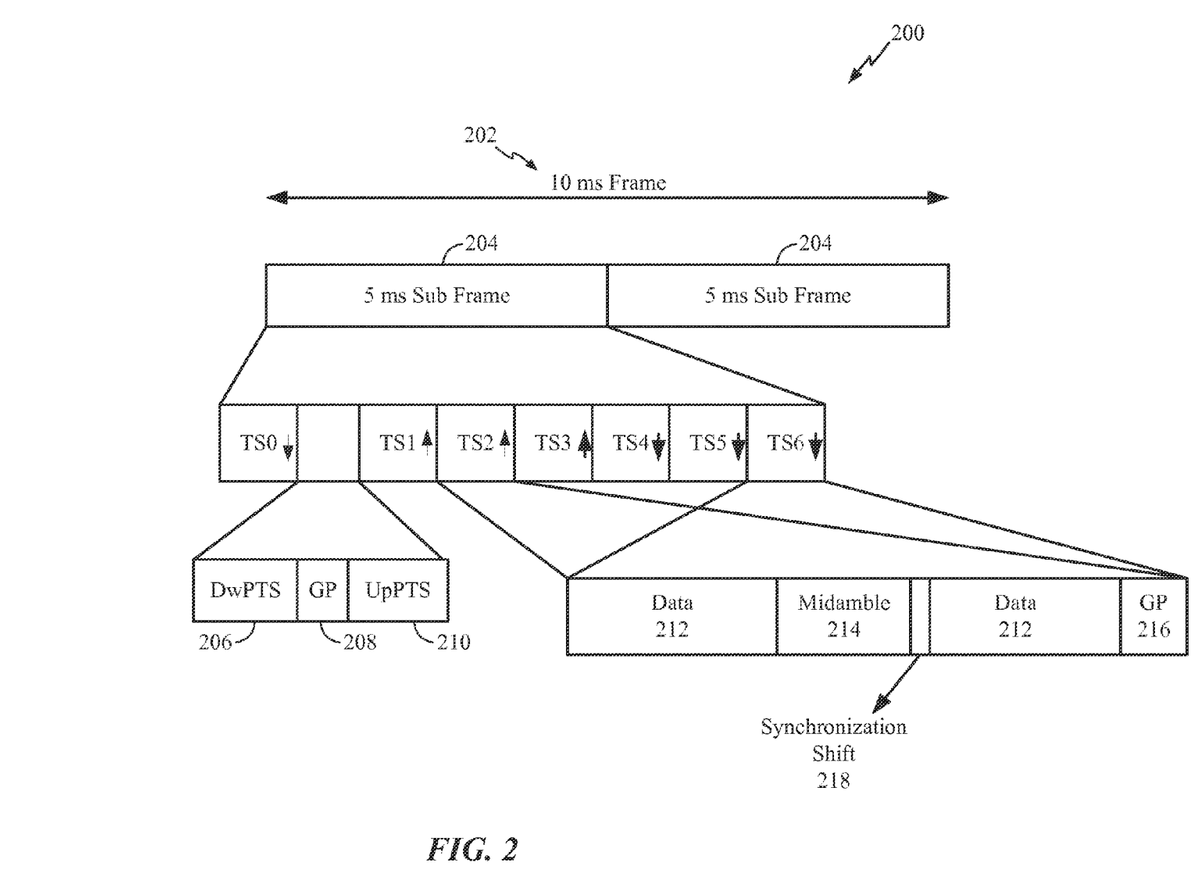
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
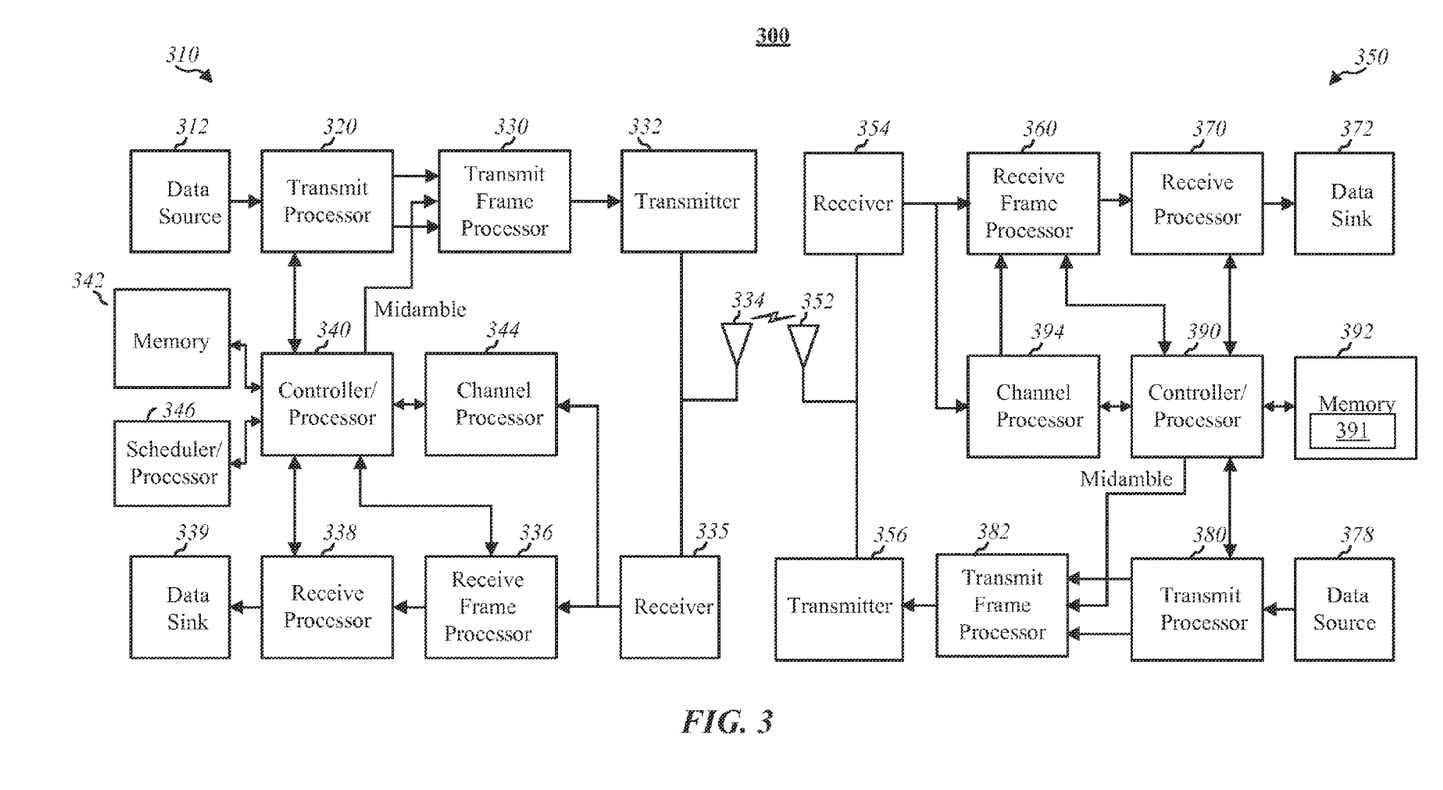
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store an time slot allocation module 391 which, when executed by the controller/processor 390, configures the UE 350 as indicated below. A scheduler/processor 346 at the node B 310 may be used to allocate resources to the UEs and schedule downlink and/or uplink transmissions for the UEs.

Allocation of Voice Idle Time Period for Inter-Rat Measurement

In a TD-SCDMA to GSM/EDGE Radio Access Network (GERAN) circuit switched (CS) handover (HO), the UEs generally camp on TD-SCDMA and then are handed over to the GERAN for voice service. Additionally, handover may also occur when there are coverage holes in the TD network.

The TD-SCDMA to GERAN IRAT (inter-radio access technology) handover may be based on event measurement reporting. IRAT and/or inter-frequency measurements may be performed, for example, when there is limited coverage of TD-SCDMA or when a UE desires a better RAT for a higher data rate during transmission. The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The serving cell signal strength may be compared to a serving system threshold. The serving system threshold may be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) may be confirmed and re-confirmed.

The IRAT measurements are performed during idle time slots, i.e., time slots that are not used for uplink (UL) or downlink (DL) communications. The idle time slots may be used for GSM/GPRS (global system for mobiles/general packet radio service) measurement for a single receiver UE. For a dual receiver UE, the second receiver may be used for GSM/GPRS measurement. To perform IRAT measurements during the idle time slots, a UE may tune to a different system/frequency over a frequency tuning time period. In a single receiver UE, when the UE is performing IRAT measurements for a potential IRAT handover, the UE may not have sufficient idle time slots to confirm and re-confirm the BSIC of a neighboring base station. For example, when performing IRAT measurements for a TD-SCDMA to GSM handover, the UE may not have sufficient idle time slots to confirm and re-confirm the BSIC of a neighboring GSM base station. Insufficient idle time slots for IRAT measurement may result in a degraded IRAT handover performance and voice call performance.

Figure 4:
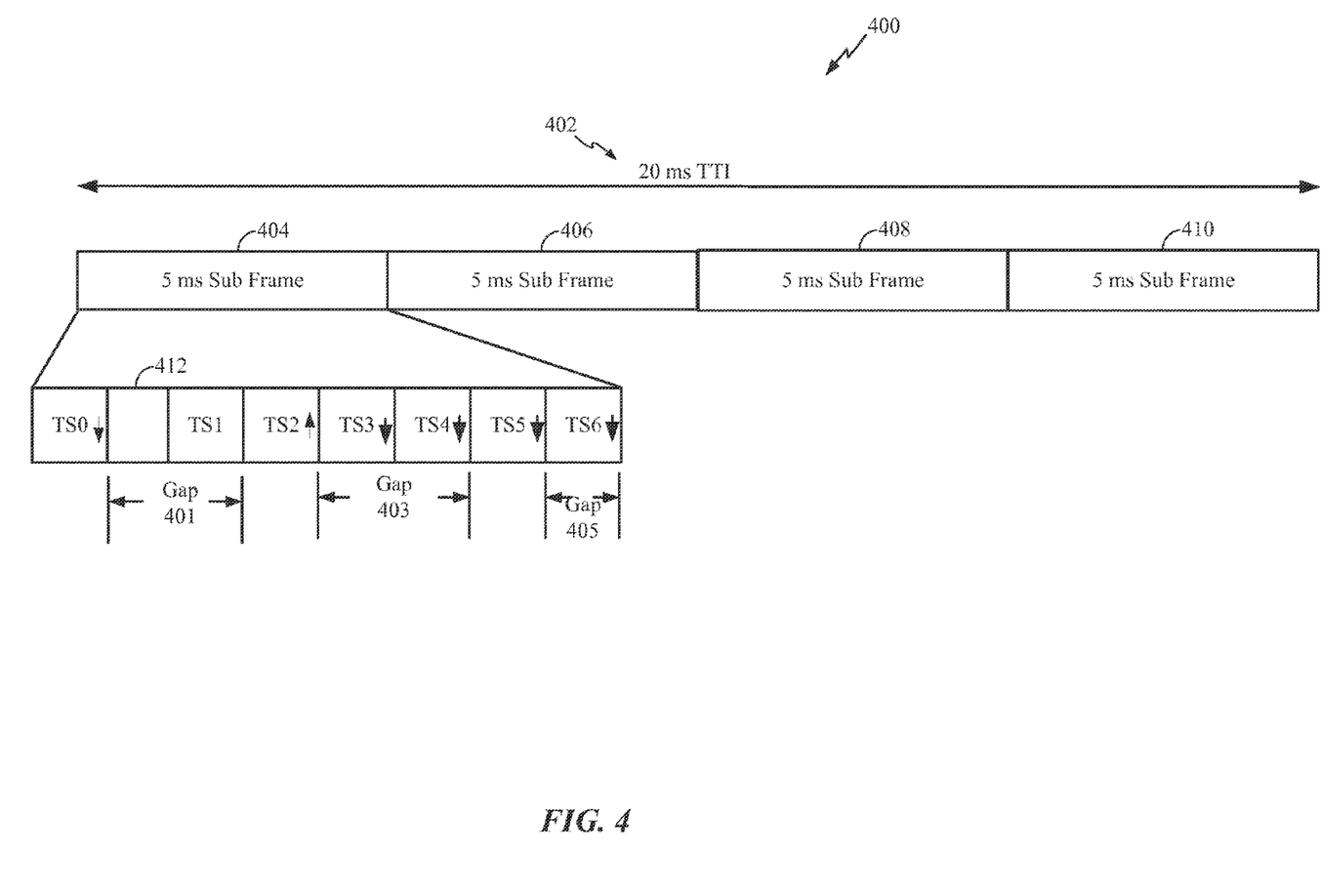
FIG. 4 is a block diagram of an exemplary frame structure for carrying voice packets of a voice call, illustrating gaps corresponding to idle time slots for inter-radio access technology measurements.

FIG. 4 is a block diagram of an exemplary frame structure for carrying voice packets of a voice call, illustrating gaps corresponding to idle time slots for inter-radio access technology measurements. The frame structure 400 may include a frame 402 that is 20 milliseconds (ms) transmission time interval (TTI). The frame 402 may include four subframes 404, 406, 408, 410 each allocated 5 ms time duration. Each subframe 404, 406, 408 or 410 is subdivided into time slots. For example, similar to subframe 204 of FIG. 2, subframe 404 is subdivided into time slots TS0-TS6 with a gap 412 between time slots TS0 and TS1. Some of the time slots, e.g., TS0 and TS2, of the subframe 404 may be allocated for UL transmission of the voice packets and some time slots, e.g., TS3, TS4, TS5 and TS6 may be allocated for downlink DL transmission of the voice packets. For example, the time slot assignment for a particular UE may be based on an allocation of 1 UL time slot such as TS2 and 1 DL time slot such as TS5 for transmission of the voice packets. The UE may receive the voice packets from a base station or node B on the assigned DL time slot TS5 and transmit the voice packets on the assigned UL time slot TS2. The UE may use the time slot TS0 to receive power measurements such as receive signal code power (RSCP) of the TD-SCDMA system intra or inter-frequency neighbors. The remaining idle time slots correspond to gaps in communication that may be used for IRAT measurements.

In this illustration, the UE may have three small gaps 401, 403 and 405 of idle time slots. The first gap 401 may include the gap 412 separating time slots TS0 and TS1 and the idle time slot TS1. The second gap 403 may include idle time slots TS3 and TS4, and the third gap 405 may include idle time slot TS6. Although each of the gaps 401, 403 and 405 may be used for IRAT measurement, the gaps are small and may not be sufficient for identifying IRAT systems such as GSM, LTE or WCDMA and for performing the IRAT measurements. Use of these small gaps may result in unsuccessful IRAT measurements.

One aspect of the disclosure improves performance of IRAT measurements by increasing the gaps of idle time slots. Based on wireless communication standards, a UE may normally transmit a special burst during this silent period so that the base station receives some indication of the silence. The period of silence during a voice call may be indicated to a recipient device with a special burst comprising an erasure packet. A voice coder/decoder (vocoder) may detect an erasure packet such that a UE is enabled to decide whether to transmit a special burst indicating the erasure packet. Instead of transmitting the special burst associated with the erasure packets, however, the UE may be configured to turn off its transmitter. As a result, the time slots that would normally be allocated for transmitting the special burst are deemed idle time slots and may be used to increase the gap of idle time slots for performing inter-RAT or intra-RAT measurements.

Figure 5:
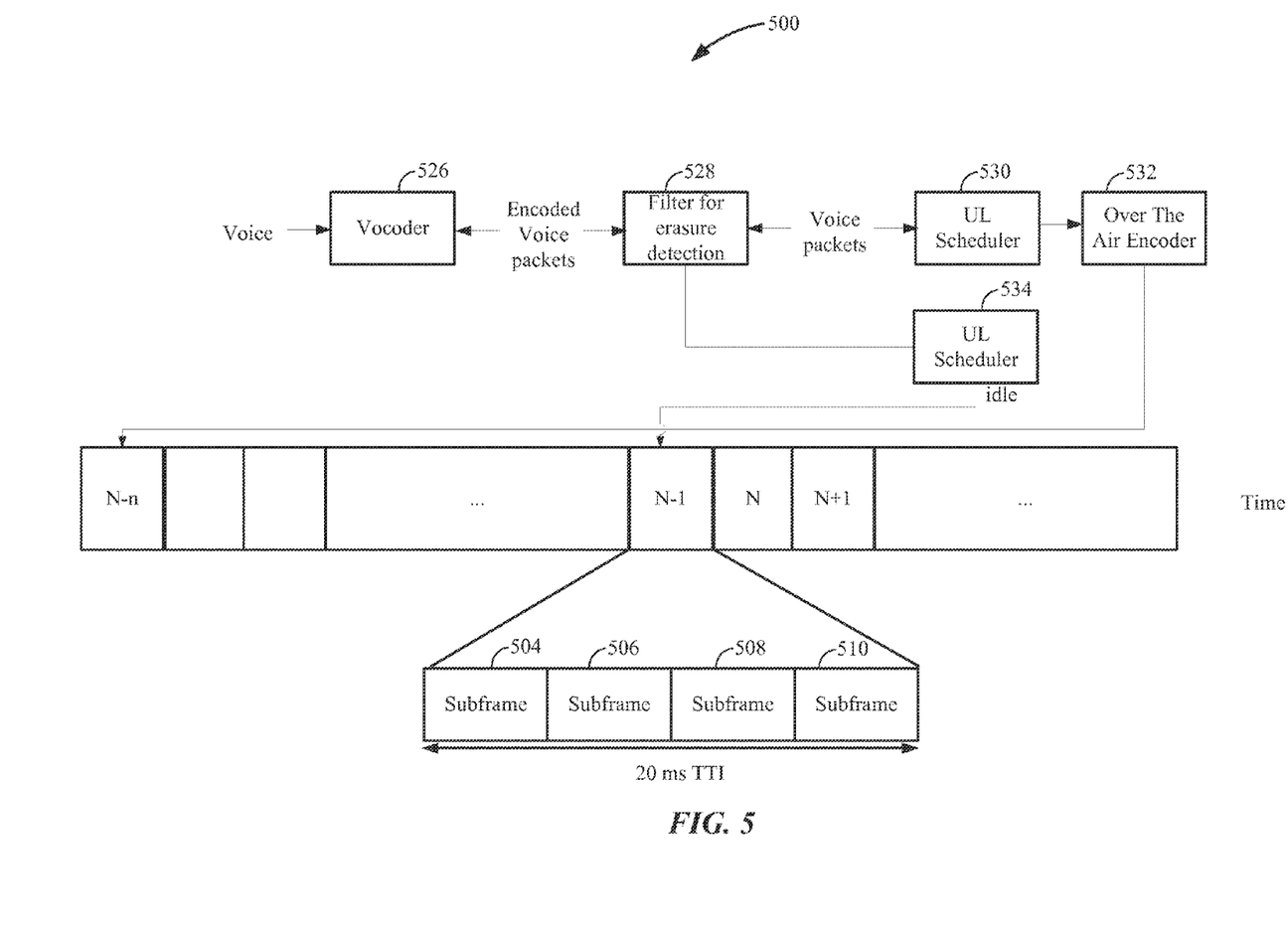
FIG. 5 illustrates a system for detecting erasure packets to enable the UE to decide whether to assign allocated time slots corresponding to the detected erasure packets for inter-radio access technology (IRAT) measurements.

FIG. 5 illustrates a system for detecting erasure packets to enable the UE to decide whether to assign for IRAT measurements, time slots that might otherwise be allocated to sending erasure packets. The system 500 includes a vocoder 526, a filter 528, a first uplink (UL) scheduler 530, a second UL scheduler 534 and an over the air encoder 532. The vocoder 526 transmits and receive an analog radio-frequency signals carrying digitally coded voice. The voice signals or packets may be encoded by the vocoder 526 for transmission and decoded for reception. The packets generated during the period of silence are deemed erasure packets. The voice packets outputted by the vocoder 526 are fed into the filter 528. The voice packets are then filtered by the filter 528 to detect whether the voice packets correspond to a period of speech or the period of silence. In one aspect of the disclosure, the filter 528 and/or the vocoder 526 detects when the voice packet corresponds to the period of speech or silence. For example, when a user is silent, the vocoder 526 and/or the filter 528 detects the erasure packet. In the silent period, there are no actual user data/speech for the UE to transmit. In this case, the UE may turn off its transmitter, send nothing to the base station during the silent period, and designate the assigned uplink slot as an idle time slot for IRAT measurement (or other purpose).

In one aspect of the disclosure, when the vocoder 526/filter 528 detects a voice packet corresponding to the speech period, the detected voice packet is forwarded to the first UL scheduler 530. The first UL scheduler 530 schedules the voice packet in an uplink TTI (transmission time interval). The detected voice packet is then forwarded to the over the air encoder 532 where it is encoded and transmitted using the entire uplink TTI. In another aspect of the disclosure, when the vocoder 526/filter 528 detects the erasure packet, the detected erasure packet is forwarded to the second UL scheduler 534. The second UL scheduler 534 treats the assigned uplink slot for the erasure packet as idle time slots. In this aspect, a transmitter of the UE is turned off to forgo transmission of the special burst associated with the erasure packet. As a result, the second UL scheduler 534 indicates that a portion of the uplink TTI or the entire uplink TTI is idle. For example, an uplink TTI N−1, of a set of uplink TTIs N−n . . . , N−1, N, N+1 . . . , may me indicated as an idle uplink TTI. Because the vocoder 526 uses 20 ms uplink TTIs, when the erasure packet is detected in the first 5 ms subframe 504, the remaining three 5 ms subframes 506, 508 and 510 are also treated as idle. Alternatively, only some of the three remaining 5 ms subframes 506, 508 and 510 are treated as idle. The idle time slots associated with the idle uplink TTIs may be added to the idle time slots of the frame structure 400 of FIG. 4, to increase the time slot gaps available for IRAT measurement.

Figure 6:
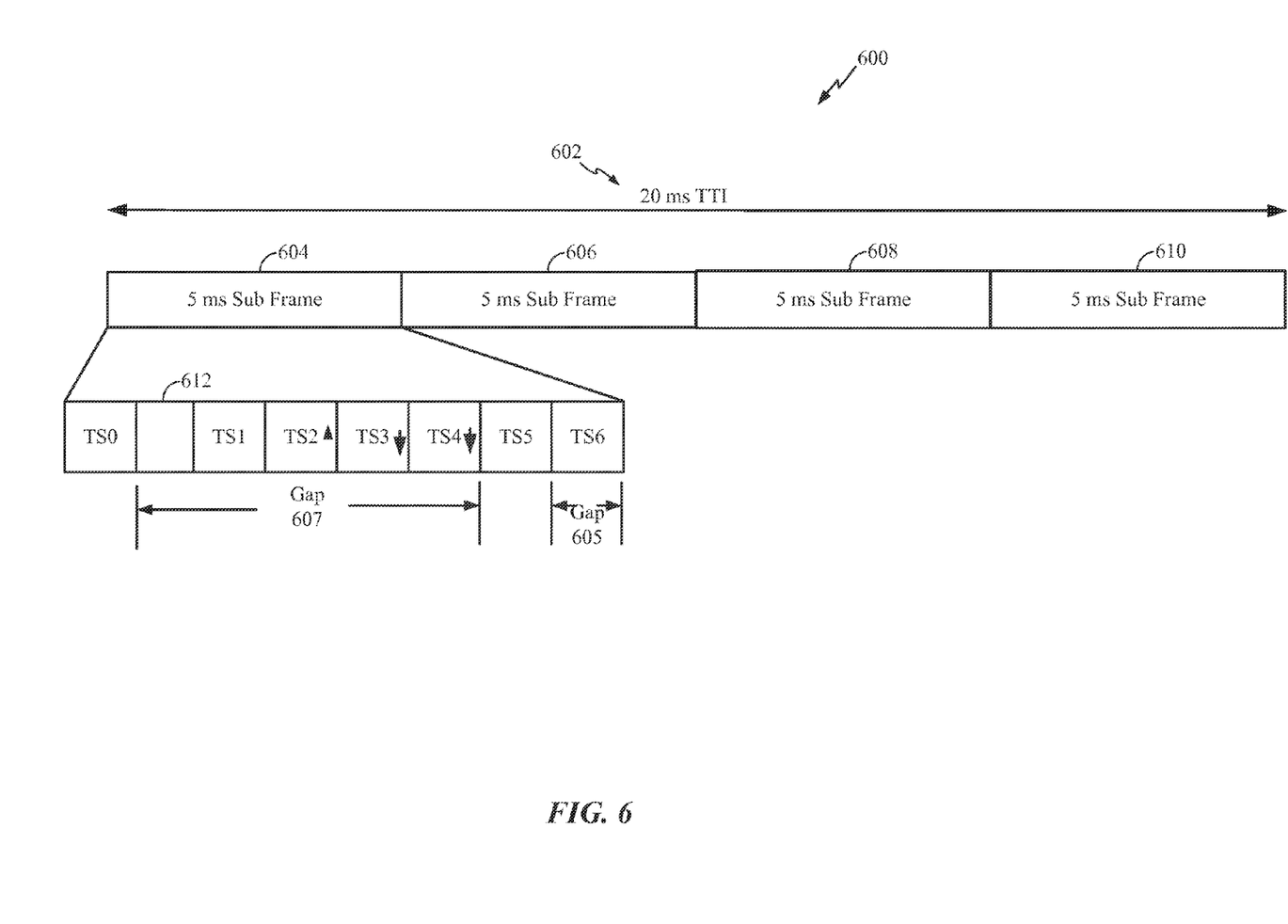
FIG. 6 is a block diagram of an exemplary frame structure illustrating an increase in gaps corresponding to idle time slots of a transmitting UE.

FIG. 6 is a block diagram of an exemplary frame structure 600 illustrating an increase in gaps corresponding to idle time slots of a transmitting UE. Similar to the frame structure 400 of FIG. 4, the frame structure 600 includes a frame 602 of 20 milliseconds (ms) transmission time interval (TTI). The frame 602 includes four subframes 604, 606, 608, 610 each allocated 5 ms time duration. Because of the detection of the erasure packet, the time slot TS2 assigned for uplink transmission is treated as an idle time slot instead of being allocated for transmitting the special burst. As a result, the gap allocated for IRAT measurement is increased. For example, in addition to the set of idle time slots TS1, TS3, TS4 and gap 612, the gap 607 for IRAT measurements is increased by the addition of the uplink idle time slot TS2. Thus, instead of two separate gaps 401 and 403 illustrated with respect to FIG. 4, the idle time slot TS2 bridges the separate gaps to form a single increased gap 607 for IRAT measurement. Similarly, detection of an erasure packet may be implemented when a downlink packet is received at a receiving UE.

Figure 7:
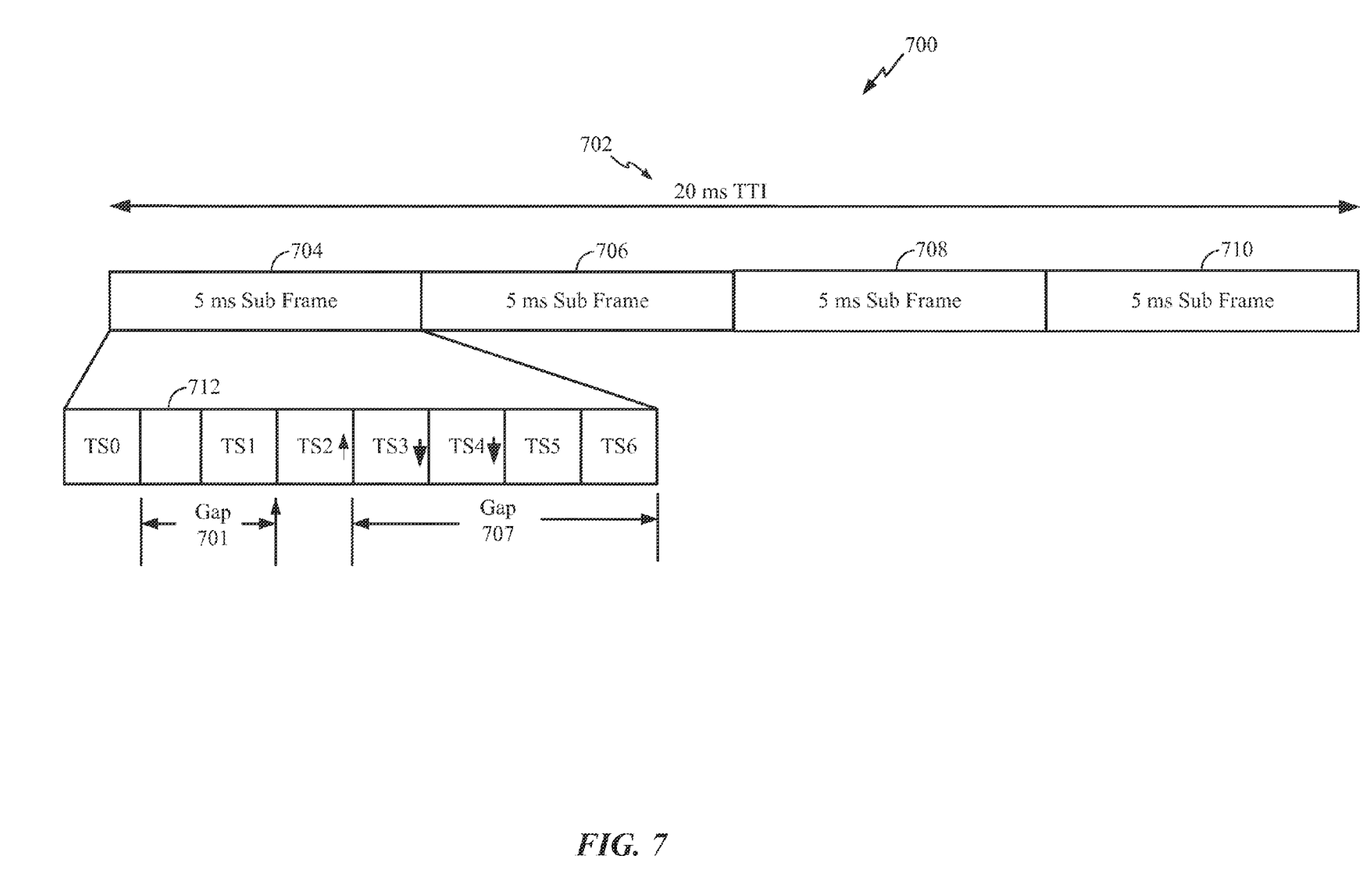
FIG. 7 is a block diagram of an exemplary frame structure illustrating an increase in gaps corresponding to idle time slots of a receiving UE.

FIG. 7 is a block diagram of an exemplary frame structure 700 illustrating an increase in gaps corresponding to idle time slots of a receiving UE. With respect to the DL transmission, the frame structure 700 includes a frame 702 of 20 milliseconds (ms) transmission time interval (TTI). The frame 702 includes four subframes 704, 706, 708, 710 each allocated 5 ms time duration. In this illustration, the time slot TS5 assigned for downlink transmission, is treated as an idle time slot instead of being allocated for transmitting the special burst when the erasure packet is detected. As a result, the gap allocated for IRAT measurement is increased. For example, in addition to the set of idle time slots TS3, TS4 and TS6, the gap 707 allocated for IRAT measurements is increased by the addition of the downlink idle time slot TS5. Thus, instead of two separate gaps 403 and 405 illustrated with respect to FIG. 4, the idle time slot TS5 bridges the separate gaps to form a single increased gap 707 for IRAT measurement. Increasing the gaps of idle time slots improves the performance of IRAT and/or inter-frequency measurements and improves IRAT handover and call performance.

Figure 8:
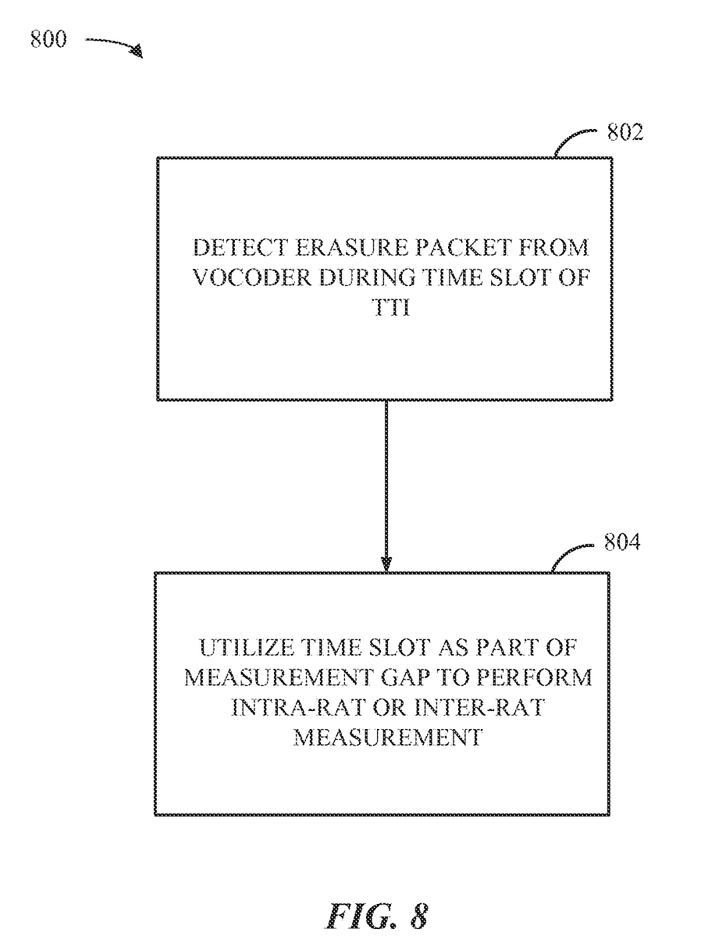
FIG. 8 is a block diagram illustrating a time slot allocation method according to one aspect of the present disclosure.

FIG. 8 shows a wireless communication method 800 according to one aspect of the disclosure. A UE detects an erasure packet from a vocoder during a time slot of a transmission time interval (TTI), as shown in block 802. A UE utilizes the time slot as part of a measurement gap to perform an intraRAT or interRAT measurement, as shown in block 804.

Figure 9:
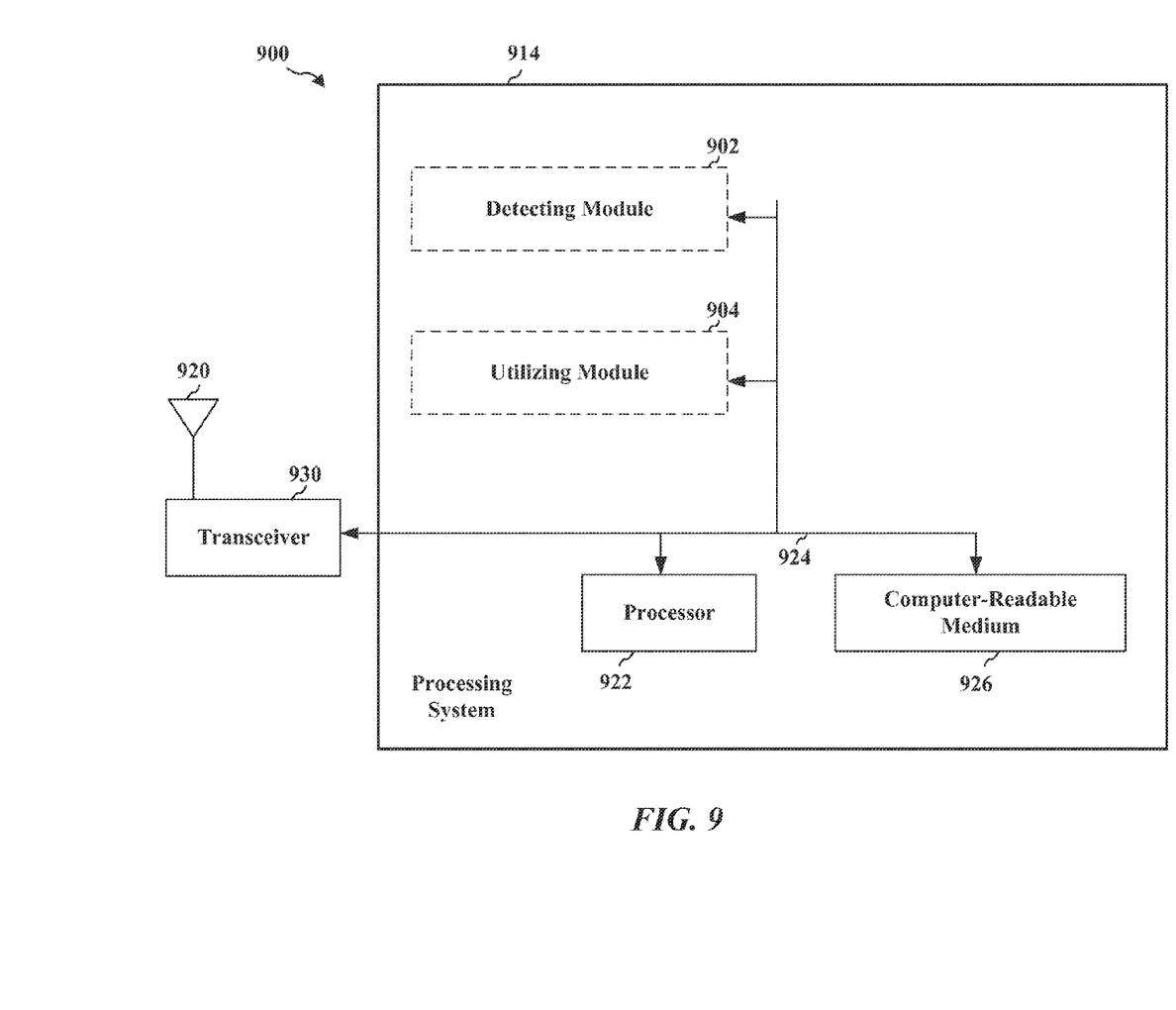
FIG. 9 is a diagram illustrating an example of a hardware implementation for an apparatus employing a processing system according to one aspect of the present disclosure.

FIG. 9 is a diagram illustrating an example of a hardware implementation for an apparatus 900 employing a time slot allocation system 914. The time slot allocation system 914 may be implemented with a bus architecture, represented generally by the bus 924. The bus 924 may include any number of interconnecting buses and bridges depending on the specific application of the time slot allocation system 914 and the overall design constraints. The bus 924 links together various circuits including one or more processors and/or hardware modules, represented by the processor 922, a detecting module 902, a utilizing module 904 and the computer-readable medium 926. The bus 924 may also link various other circuits such as timing sources, peripherals, voltage regulators, and power management circuits, which are well known in the art, and therefore, will not be described any further.

The apparatus includes a time slot allocation system 914 coupled to a transceiver 930. The transceiver 930 is coupled to one or more antennas 920. The transceiver 930 enables communicating with various other apparatus over a transmission medium. The time slot allocation system 914 includes a processor 922 coupled to a computer-readable medium 926. The processor 922 is responsible for general processing, including the execution of software stored on the computer-readable medium 926. The software, when executed by the processor 922, causes the time slot allocation system 914 to perform the various functions described for any particular apparatus. The computer-readable medium 926 may also be used for storing data that is manipulated by the processor 922 when executing software.

The time slot allocation system 914 includes the detecting module 902 for detecting an erasure packet from a vocoder during a time slot of a transmission time interval (TTI). The time slot allocation system 914 also includes the utilizing module 904 for utilizing the time slot as part of a measurement gap to perform an intraRAT or interRAT measurement. The modules may be software modules running in the processor 922, resident/stored in the computer-readable medium 926, one or more hardware modules coupled to the processor 922, or some combination thereof. The time slot allocation system 914 may be a component of the UE 350 and may include the memory 392, and/or the controller/processor 390.

In one configuration, an apparatus such as a UE is configured for wireless communication including means for detecting. In one aspect, the detecting means may be the controller/processor 390, the memory 392, filter 528, schedulers 530, 534, the time slot allocation module 391, detecting module 902 and/or the time slot allocation system 914 configured to perform the functions recited by the aforementioned means. In another aspect, the aforementioned means may be a module or any apparatus configured to perform the functions recited by the aforementioned means.

In one configuration, an apparatus such as a UE is configured for wireless communication including means for utilizing. In one aspect, the utilizing means may be the controller/processor 390, the memory 392, schedulers 530, 534, the time slot allocation module 391, the utilizing module 904 and/or the time slot allocation system 914 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   detecting a packet from a vocoder during a time slot of a transmission time interval (TTI), in which the packet indicates a silent period during a voice communication;
   enabling a user equipment (UE) to decide whether to transmit, utilizing the time slot, a special burst indicating the packet from the vocoder or to allocate the time slot for an intra radio access technology (RAT) measurement or interRAT measurement; and
   utilizing the time slot as part of a measurement gap to perform the intraRAT or interRAT measurement when the UE decides not to transmit the special burst.

2. The method of claim 1, in which the detecting occurs at a transmitting user equipment (UE) and the time slot is an uplink time slot.

3. The method of claim 1, further comprising using remaining time slots of the TTI as part of the measurement gap.

4. The method of claim 1, further comprising using a first portion of remaining time slots of the TTI as part of the measurement gap and using a second portion of remaining time slots of the TTI to transmit or receive at least one other packet.

5. The method of claim 4 in which the at least one other packet comprises at least one other packet indicating a silent period during the voice communication or an over the air packet.

6. An apparatus for wireless communication, comprising:
   means for detecting a packet from a vocoder during a time slot of a transmission time interval (TTI), in which the packet indicates a silent period during a voice communication;
   means for enabling a user equipment (UE) to decide whether to transmit, utilizing the time slot, a special burst indicating the packet from the vocoder or to allocate the time slot for an intra radio access technology (RAT) measurement or interRAT measurement; and means for utilizing the time slot as part of a measurement gap to perform the intraRAT or interRAT measurement when the UE decides not to transmit the special burst.

7. The apparatus of claim 6, in which the detecting means further comprises means for detecting at a transmitting user equipment (UE) during an uplink time slot.

8. The apparatus of claim 6, further comprising means for using remaining time slots of the TTI as part of the measurement gap.

9. The apparatus of claim 6, further comprising means for using a first portion of remaining time slots of the TTI as part of the measurement gap and means for using a second portion of remaining time slots of the TTI to transmit or receive at least one other packet.

10. An apparatus for wireless communication, comprising:
 a memory; and
 at least one processor coupled to the memory and configured:
  to detect a packet from a vocoder during a time slot of a transmission time interval (TTI), in which the packet indicates a silent period during a voice communication;
  to enable a user equipment to decide whether to transmit, utilizing the time slot, a special burst indicating the packet from the vocode or to allocate the time slot for an intra radio access technology (RAT) measurement or interRAT measurement; and
  to utilize the time slot as part of a measurement gap to perform the intraRAT or interRAT measurement when the UE decides not to transmit the special burst.

11. The apparatus of claim 10, in which the at least one processor is further configured to detect by detecting at a transmitting user equipment (UE) during an uplink time slot.

12. The apparatus of claim 10, in which the at least one processor is further configured to use remaining time slots of the TTI as part of the measurement gap.

13. The apparatus of claim 10, in which the at least one processor is further configured to use a first portion of remaining time slots of the TTI as part of the measurement gap and to use a second portion of remaining time slots of the TTI to transmit or receive at least one other packet.

14. The apparatus of claim 13 in which the at least one other packet comprises at least one other packet indicating a silent period during the voice communication or an over the air packet.

15. An computer program product for wireless communication in a wireless network, comprising:
 a computer-readable medium having non-transitory program code recorded thereon, the program code comprising:
  program code to detect a packet from a vocoder during a time slot of a transmission time interval (TTI), in which the packet indicates a silent period during a voice communication;
  program code to enable a user equipment to decide whether to transmit, utilizing the time slot, a special burst indicating the packet from the vocoder or to allocate the time slot for an intra radio access technology (RAT) measurement or interRAT measurement; and
  program code to utilize the time slot as part of a measurement gap to perform the intraRAT or interRAT measurement when the UE decides not to transmit the special burst.

16. The computer program product of claim 15, in which the program code further comprises code to detect by detecting at a transmitting user equipment (UE) during an uplink time slot.

\* \* \* \* \*